United States Patent
Hu

(10) Patent No.: US 12,302,867 B2
(45) Date of Patent: May 20, 2025

(54) INTELLIGENT BIRD FEEDING METHOD, ELECTRONIC DEVICE AND BIRD FEEDER

(71) Applicant: Netvue Technologies Co., Ltd., Shenzhen (CN)

(72) Inventor: Youle Hu, Shenzhen (CN)

( * ) Notice: Subject to any disclaimer, the term of this patent is extended or adjusted under 35 U.S.C. 154(b) by 362 days.

(21) Appl. No.: 17/877,079

(22) Filed: Jul. 29, 2022

(65) Prior Publication Data
US 2023/0027590 A1    Jan. 26, 2023

(30) Foreign Application Priority Data

Jun. 1, 2021 (CN) .......................... 202110607292.5

(51) Int. Cl.
 A01K 39/012 (2006.01)
 G06V 20/40 (2022.01)
 G06V 20/50 (2022.01)
 G06V 40/10 (2022.01)

(52) U.S. Cl.
 CPC ............ *A01K 39/012* (2013.01); *G06V 20/41* (2022.01); *G06V 20/50* (2022.01); *G06V 40/103* (2022.01)

(58) Field of Classification Search
None
See application file for complete search history.

(56) References Cited

FOREIGN PATENT DOCUMENTS

| CN | 110503012 A | * | 11/2019 | |
|---|---|---|---|---|
| CN | 110896871 A | * | 3/2020 | ........... A01K 5/0275 |
| CN | 111027378 A | | 4/2020 | |
| CN | 112559785 A | | 3/2021 | |

OTHER PUBLICATIONS

Dixon LM, Brocklehurst S, Sandilands V, Bateson M, Tolkamp BJ, et al. (2014) Measuring Motivation for Appetitive Behaviour: Food-Restricted Broiler Breeder Chickens Cross a Water Barrier to Forage in an Area of Wood Shavings without Food. PLOS ONE 9(7): e102322. https://doi.org/10.1371/journal.pone.0102322.*
First office action of CN202110607292.5.
Bird Buddy Inc.'s copyright registration certificate for its smart bird feeder product issued by Copyright Protection Center of China.†
Bird Buddy Inc.'s Application for registration of copyright filed with the Copyright Office of Slovenia.†

\* cited by examiner
† cited by third party

*Primary Examiner* — Jiangeng Sun

(57) ABSTRACT

An intelligent bird feeding method may include: shooting video information of a bird in a preset area through the camera component; transmitting the video information to an electronic device to indicate the electronic device to determine a category of the bird and a state of the bird based on the video information; determining whether a bird food needs to be fed and a category of the bird food to be fed based on the category of the bird and the state of the bird; and under the circumstance that the bird food needs to be fed, selecting a bird food of a corresponding category for feeding according to the category of the bird food to be fed.

12 Claims, 7 Drawing Sheets

INTELLIGENT BIRD FEEDING METHOD, ELECTRONIC DEVICE AND BIRD FEEDER

CROSS REFERENCE TO RELATED APPLICATION

This application claims priority benefit of Chinese Invent application Ser. No. 20/211,0607292.5, filed on Jun. 1, 2021, and the entire contents of which are incorporated herein by reference.

TECHNICAL FIELD

The present disclosure relates to artificial intelligences, and in particular to an intelligent bird feeding method, an electronic device, a bird feeder and a non-transitory computer-readable storage medium.

BACKGROUND

With the acceleration of people's life pace and the convenience brought by intelligence technology to people's lives, intelligent bird breeding technology has become a major interest of pet lovers. The related intelligent bird feeder usually only adds a certain automatic function related to feeding, e.g., the function of automatically opening and closing the door, the function of automatically adding water and food, or the function of timing reminders, etc., to a normal bird feeder. The entire process of feeding the birds still needs manual assistance and does not have the function of independently feeding birds.

SUMMARY OF THE DISCLOSURE

Aiming at the above problems existing in the related art, the present disclosure provides an intelligent bird feeding method, an electronic device, a bird feeder and a non-transitory computer-readable storage medium.

According to the first aspect of the present disclosure, an intelligent bird feeding method is provided. The method is executable for a bird feeder which comprises a camera component. The method may include: shooting video information of a bird in a preset area through the camera component; transmitting the video information to an electronic device to indicate the electronic device to determine a category of the bird and a state of the bird based on the video information; determining whether a bird food needs to be fed and a category of the bird food to be fed based on the category of the bird and the state of the bird; and under the circumstance that the bird food needs to be fed, selecting a bird food of a corresponding category for feeding according to the category of the bird food to be fed.

Typically, after the transmitting the video information to the electronic device to indicate the electronic device to determine the category of the bird and the state of the bird based on the video information, the method further comprises: receiving the category of the bird and the state of the bird from the electronic device.

Typically, the transmitting the video information to the electronic device to indicate the electronic device to determine the category of the bird and the state of the bird based on the video information comprises transmitting the video information to the electronic device to indicate the electronic device to analyze the video information through a pre-trained multi-task recognition model to obtain the category of the bird and the state of the bird.

Typically, the pre-trained multi-task recognition model is obtained through a training process and a testing process; the training process comprises training a preset multi-task recognition model based on training samples each labeled with a category of a bird contained therein and a state of the bird contained therein to obtain a trained multi-task recognition model; the testing process comprises inputting testing samples each containing a first bird to the trained multi-task recognition model for analyzation, and determining a recognition accuracy of the trained multi-task recognition model based on outputs of the trained multi-task recognition model.

Typically, the determining whether the bird food needs to be fed and the category of the bird food to be fed based on the category of the bird and the state of the bird comprises: determining whether the bird food needs to be fed based on a pre-saved first mapping relationship between bird states and bird food dosages; and determining the category of the bird food to be fed based on a pre-saved second mapping relationship between bird categories and bird food categories.

Typically, the selecting the bird food of the corresponding category for feeding according to the category of the bird food to be fed comprises: determining a first bird food bin storing the bird food of the corresponding category based on a pre-saved third mapping relationship between the bird food categories and bird food bin identifications; and selecting the bird food of the corresponding category from the first bird food bin for feeding.

Typically, the selecting the bird food of the corresponding category from the first bird food bin for feeding comprises: detecting a remaining amount of the bird food of the corresponding category in a feeding area; and under the circumstance that the remaining amount is greater than a preset value, not feeding the bird food of the corresponding category, under the circumstance that the remaining amount is smaller than or equal to the preset value, feeding the bird food of the corresponding category.

According to the second aspect of the present disclosure, an intelligent bird feeding method is provided. The method is executable for an electronic device communicatively connected to a bird feeder. The method may include: determining a category of a bird and a state of the bird based on video information of the bird shot by the bird feeder; and transmitting the category of the bird and the state of the bird to the bird feeder to indicate the bird feeder to determine whether a bird food needs to be fed and a category of the bird food to be fed based on the category of the bird and the state of the bird and under the circumstance that the bird food needs to be fed select a bird food of a corresponding category for feeding according to the category of the bird food to be fed.

Typically, the determining the category of the bird and the state of the bird based on video information of the bird shot by the bird feeder comprises: analyzing the video information through a pre-trained multi-task recognition model to obtain the category of the bird and the state of the bird.

Typically, before the analyzing the video information through the pre-trained multi-task recognition model to obtain the category of the bird and the state of the bird, the method further comprises obtaining the pre-trained multi-task recognition model through a training process and a testing process, wherein the training process comprises training a preset multi-task recognition model based on training samples each labeled with a category of a bird contained therein and a state of the bird contained therein to obtain a trained multi-task recognition model; and the testing process comprises inputting testing samples each containing a first bird to the trained multi-task recognition model for analyzation, and determining a recognition accuracy of the trained multi-task recognition model based on outputs of the trained multi-task recognition model.

Typically, the determining the recognition accuracy of the trained multi-task recognition model based on the outputs of the trained multi-task recognition model comprises: under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples; under the circumstance that the recognition accuracy is smaller than or equal to the preset probability threshold, determining that the test for the recognition accuracy is not passed, and increasing a number of the training samples and repeating the training process and the testing process until the test for the recognition accuracy is passed.

Typically, the pre-trained multi-task recognition model comprises a first output branch and a second output branch, the first output branch is configured to output the category of the bird, and the second output branch is configured to output the state of the bird.

According to the third aspect of the present disclosure, an electronic device is provided. The electronic device may be communicatively connected to a bird feeder and configured to determine a category of a bird and a state of the bird based on video information of the bird shot by the bird feeder and transmit the category of the bird and the state of the bird to the bird feeder to indicate the bird feeder to determine whether a bird food needs to be fed and a category of the bird food to be fed based on the category of the bird and the state of the bird and under the circumstance that the bird food needs to be fed select a bird food of a corresponding category for feeding according to the category of the bird food to be fed.

According to the fourth aspect of the present disclosure, a bird feeder is provided. The bird feeder may include a non-transitory memory and a processor which are coupled with each other, wherein the memory is configured to store program instructions, and the processor is capable of executing the program instructions to implement the intelligent bird feeding method according to the first aspect of the present disclosure.

According to the fifth aspect of the present disclosure, an electronic device is provided. The electronic device may include a non-transitory memory and a processor which are coupled with each other, wherein the memory is configured to store program instructions, and the processor is capable of executing the program instructions to implement the intelligent bird feeding method according to the second aspect of the present disclosure.

According to the sixth aspect of the present disclosure, a non-transitory computer-readable storage medium is provided. The non-transitory computer-readable storage medium may have program instructions stored therein. The program instructions are capable of being executed by a processor to implement the intelligent bird feeding method according to the first aspect of the present disclosure.

According to the seventh aspect of the present disclosure, a non-transitory computer-readable storage medium is provided. The non-transitory computer-readable storage medium may have program instructions stored therein. The program instructions are capable of being executed by a processor to implement the intelligent bird feeding method according to the second aspect of the present disclosure.

The embodiments of the present disclosure provide an intelligent bird feeding method, an electronic device, a bird feeder and a non-transitory computer-readable storage medium. The method may include: shooting video information of a bird in a preset area through the camera component; transmitting the video information to an electronic device to indicate the electronic device to determine a category of the bird and a state of the bird based on the video information; determining whether a bird food needs to be fed and a category of the bird food to be fed based on the category of the bird and the state of the bird; and under the circumstance that the bird food needs to be fed, selecting a bird food of a corresponding category for feeding according to the category of the bird food to be fed. Automatic bird feeding without manual assistance can be realized, and thus intelligent bird feeding can be realized.

BRIEF DESCRIPTION OF THE DRAWINGS

In order to illustrate technical solutions of the embodiments of the present disclosure clearly, accompanying drawings for describing the embodiments will be introduced in brief. Obviously, the drawings in the following description are only some embodiments of the present disclosure. For the person of ordinary skill in the art, other drawings may be obtained based on the provided drawings without any creative work, wherein.

DETAILED DESCRIPTION

Figure 1:
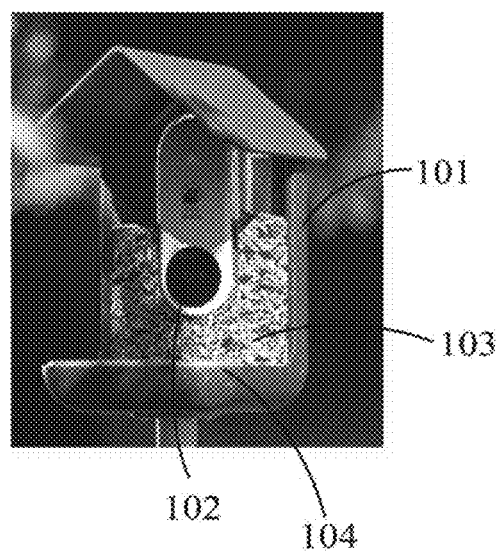
FIG. 1 is a schematic diagram of a bird feeder according to an embodiment of the present disclosure.

The present disclosure will be described clearly and thoroughly herein by accompanying with appended figures of some embodiments. Apparently, the embodiments are only part of the present disclosure, and are not the whole disclosure. For the person of ordinary skill in the art, other embodiments may be obtained based on the provided embodiments without any creative work, and the other embodiments are also covered by the present disclosure.

The flow diagram shown in the drawings is only an example illustration and does not have to include all of the contents and operations/steps, nor does it have to be performed in the order depicted. For example, some operations/steps may also be broken down, combined or partially merged, so the actual order of execution may change depending on the actual situation.

FIG. 1 is a schematic diagram of a bird feeder according to an embodiment of the present disclosure. Referring to FIG. 1, in the present embodiment, the bird feeder 100 includes a main body 101, a camera component 102 provided on the main body 101, a bird food bin 103 and a feeding area 104. Specifically, the camera component 102 is configured to take a video of at least a bird in a preset area. Specifically, the preset area is a predetermined space area for raising birds, e.g., an area in a bird cage, an area for birds in a zoo, or any other area for raising birds.

The bird food bin 103 is configured to store bird food to be fed. Specifically, the bird food bin 103 may include multiple partitions, and each of the partitions is configured to store food for different categories of birds (FIG. 1 only exemplarily shows a bird food bin with one partition).

The feeding area 104 is configured to place the food that is fed. Specifically, a door that can be controlled to open or close can be provided between the feeding area 104 and the bird food bin 103. When the door is opened, feeding can be performed; when the door is closed, feeding can be stopped.

Understandably, FIG. 1 only exemplarily shows the structure of the bird feeder 100 and does not constitute a limitation on the structure of the bird feeder 100. For example, in some other embodiments, the bird feeder 100 may also include a water storage area, an anti-theft module, a power supply module, a charging module, a safety warning module, and a communication module. Specifically, the water storage area is configured to store water for feeding birds. The anti-theft module is configured to detect abnormal operation behaviors, and send out an early warning message after detecting said abnormal operation behaviors. The power supply module and the charging module jointly ensure that the bird feeder 100 has sufficient power for normal operation. The safety warning module is configured to detect the working status of the bird feeder 100, and send out a safety warning message when it is determined that the bird feeder 100 is in a dangerous state, e.g., insufficient battery power, the temperature being too high, or being damaged (by animals such as squirrels etc.).

The communication module is configured to be communicatively connected to other devices. Illustratively, the communication module can be communicatively connected to the user's terminal device to bind the bird feeder 100 to the terminal device. The user can monitor the data information of the bound bird feeder 100 through the terminal device, and share the information of the bound bird feeder 100 with other users, such as family or friends. Typically, after the bird feeder 100 is bound to the terminal device, the bird feeder 100 may send the usage status data to the terminal device, so that the terminal device can analyze whether the bird feeder 100 has any usage problem, such as whether it is safe to charge, whether there is any leakage of food or insensitive automatic feeding, etc.

Specifically, in the present embodiment, the camera component 102 may include, but is not limited to, a box camera, a dome camera, an integrated camera, an infrared day and night camera, a high-speed dome camera, or a network camera etc.

The bird food bin 103 may be suspended on the main body 101, or embedded in the main body 101 as a part of the main body 101. Specifically, the shape of the bird food bin 103 may be any geometric shape category, which is not specifically limited herein.

In addition, the bird feeder 100 provided by embodiment according to the present disclosure can be configured to automatically feed birds in places with multiple categories of birds, such as pet shops and zoos etc., Specifically, after the camera component 102 shooting video information of a bird in the preset area, the bird feeder 100 transmits the video information to an electronic device through the communication module to indicate the electronic device to analyze the video information to obtain a category of the bird and a state of the bird. The bird feeder 100 determines whether a bird food needs to be fed and a category of bird food to be fed based on the state and the category of the bird returned by the electronic device. When it is determined that the bird food needs to be fed, the bird feeder 100 selects a bird food of a corresponding category for feeding according to the category of bird food that needs to be fed. The bird feeding can be realized automatically without manual assistance.

Figure 2:
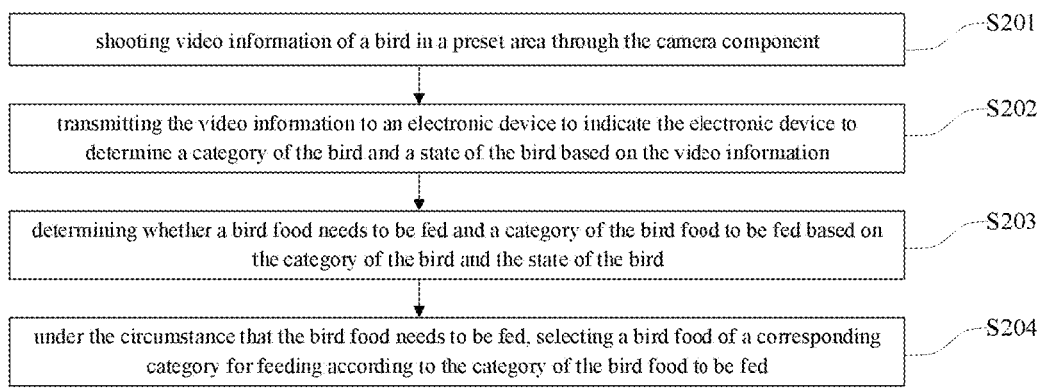
FIG. 2 is a flow diagram of an intelligent bird feeding method according to an embodiment of the present disclosure.

FIG. 2 is a flow diagram of an intelligent bird feeding method according to an embodiment of the present disclosure. The intelligent bird feeding method provided in the present embodiment can be executed by the bird feeder shown in FIG. 1. Referring to FIG. 2, the intelligent bird feeding method may comprise the following blocks.

S201: the bird feeder can shoot video information of a bird in a preset area through the camera component.

Specifically, the bird feeder can be hung at a feeding position of the preset bird-raising area (area for free-ranging birds), or set on the bird cage (caged raising). The bird feeder can control the camera component provided on the bird feeder to rotate freely, so that the video information of at least a bird in the entire preset area can be shot by the camera component. Understandably, the shot video information of the bird(s) includes the shape of the bird and the action of the bird(s) (e.g., flying, foraging, or resting, etc.). In addition, when the bird is flying or foraging, it usually makes a bird call. Therefore, the video information of the bird(s) also includes the sound information of the bird. Since different categories of birds have different shapes and different actions, and different categories of birds can emit different sound information, when the bird feeder provided by an embodiment according to the present disclosure is used in an area with multiple categories of birds, the category and the state of the bird to be fed can be effectively identified based on the shape of the bird, the movement of the bird, and the sound of the bird contained in the video information.

S202: the bird feeder can transmit the video information to an electronic device to indicate the electronic device to determine a category of the bird and a state of the bird based on the video information.

In an embodiment, the electronic device may analyze the video information through a pre-trained multi-task recognition model to obtain the category of the bird and the state of the bird.

Specifically, the pre-trained multi-task recognition model can be pre-trained by an electronic device with computing function. In some embodiments according to the present disclosure, the bird feeder is communicatively connected to the electronic device through a communication module. In some embodiments, the communication module may be a wireless communication module, such as Bluetooth, Wi-Fi, ZigBee, digital radio, etc. In some embodiments, the communication module may be a wired communication module, such as a communication module using tangible medium such as metal wires, optical fibers, etc. for communication.

Typically, the electronic device may be a single server or a server cluster, a cloud computer, etc.

Specifically, the pre-trained multi-task recognition model is obtained through a training process and a testing process.

The training process comprises training a preset multi-task recognition model based on training samples each labeled with a category of a bird contained therein and a state of the bird contained therein to obtain a trained multi-task recognition model. The testing process comprises inputting testing samples each containing a first bird to the trained multi-task recognition model for analyzation, and determining a recognition accuracy of the trained multi-task recognition model based on outputs of the trained multi-task recognition model.

Specifically, the recognition process of the bird category may be based on the external shape and/or the sound of the bird. The recognition of the bird's state can be based on the actions of the bird's actions. Specifically, when labeling samples (images or videos) containing birds, the external shape of the bird and the bird's actions are labelled. The mapping relationship between the external shape of the bird and the category label of the bird and the mapping relationship between the bird's action and the action label are established.

In an embodiment, the determining the recognition accuracy of the trained multi-task recognition model based on the outputs of the trained multi-task recognition model comprises: under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples; under the circumstance that the recognition accuracy is smaller than or equal to the preset probability threshold, determining that the test for the recognition accuracy is not passed, and increasing a number of the training samples and repeating the training process and the testing process until the test for the recognition accuracy is passed.

In addition, the multi-task recognition model may include a first output branch and a second output branch, wherein the first output branch is configured to output the category of the bird, and the second output branch is configured to output the state of the bird.

S203: the bird feeder can determine whether bird food needs to be fed and the category of bird food to be fed according to the category of the bird and the state of the bird.

In one embodiment, a first mapping relationship between bird states and bird food dosages and a second mapping relationship between bird categories and bird food categories is pre-saved in the bird feeder. Specifically, the states of the bird include movement (for example, flying, walking or foraging), resting, etc.; the categories of the bird include, but are not limited to, ostrich, emu, cassowary, and wingless bird etc. Specifically, bird food categories include, but are not limited to, cereals, insects, omnivores or meat. For example, according to the categories of birds, the birds can be determined as grain-eating birds, insectivorous birds, omnivorous birds or carnivorous birds, and the second mapping relationship between bird categories and bird food categories is established.

Specifically, the determining whether the bird food needs to be fed and the category of the bird food to be fed based on the category of the bird and the state of the bird comprises: determining whether the bird food needs to be fed based on the pre-saved first mapping relationship between bird states and bird food dosages; and determining the category of the bird food to be fed based on the pre-saved second mapping relationship between bird categories and bird food categories.

S204: under the circumstance that the bird food needs to be fed, the bird feeder can select a bird food of a corresponding category for feeding according to the category of the bird food to be fed.

In one embodiment, when the bird is in the state of foraging (for example, hunting for insects or pecking at plants, etc.), it is determined that the bird food needs to be fed. Correspondingly, the bird food of the corresponding category can be selected for feeding. A third mapping relationship between the bird food categories and bird food bin identifications is pre-saved in the bird feeder. Specifically, the bird feeder may determine a first bird food bin storing the bird food of the corresponding category based on the pre-saved third mapping relationship between the bird food categories and bird food bin identifications; and select the bird food of the corresponding category from the first bird food bin for feeding.

Typically, the bird feeder provided by the embodiment according to the present disclosure may have the function of detecting the remaining amount of bird food in the feeding area. After determining that the bird food needs to be fed based on the category of the bird and the state of the bird, the bird feeder may further detect the remaining amount of the bird food of the corresponding category in the feeding area at the current moment. When the remaining amount is greater than a preset value, there is no need to feed the corresponding category of bird food and the bird feeder may not feed the bird food of the corresponding category. When the remaining amount is smaller than or equal to the preset value, the bird feeder may feed the bird food of the corresponding category.

In addition, the bird feeder provided by the embodiment according to the present disclosure can have the function of attracting birds to eat. For example, the bird feeder selectively emits the calls of the birds to be fed according to the categories of birds to be fed, so as to induce the birds of the categories to be fed to approach the bird feeder and choose to eat. Typically, the calls of different categories of birds can be pre-saved in the bird feeder, and when a specific category of bird needs to be fed, the call of the specific category of bird is selectively emitted.

The intelligent bird feeding method provided by the above embodiments according to the present disclosure may include: shooting video information of a bird in a preset area through the camera component; transmitting the video information to an electronic device to indicate the electronic device to determine a category of the bird and a state of the bird based on the video information; determining whether a bird food needs to be fed and a category of the bird food to be fed based on the category of the bird and the state of the bird; and under the circumstance that the bird food needs to be fed, selecting a bird food of a corresponding category for feeding according to the category of the bird food to be fed. Automatic bird feeding without manual assistance can be realized, and thus intelligent bird feeding can be realized.

Figure 3:
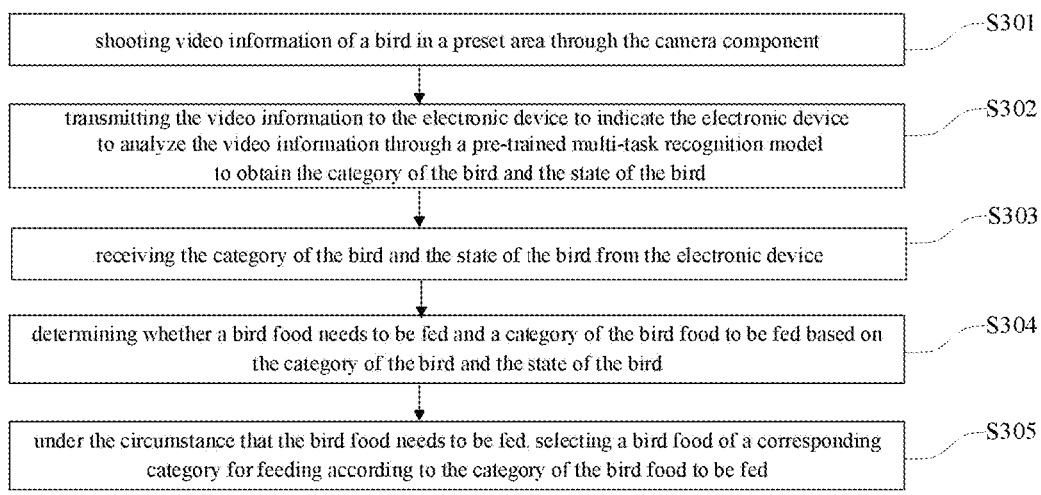
FIG. 3 is a flow diagram of an intelligent bird feeding method according to another embodiment of the present disclosure.

FIG. 3 is a flow diagram of an intelligent bird feeding method according to another embodiment of the present disclosure. Compared with the embodiment shown in FIG. 2, the specific implementation process of S301 and S201 are identical, S304 to S306 and S202 to S204 are identical, except that the present embodiment further comprises S303 before S304. Referring to FIG. 3, the intelligent bird feeding method may comprise the following blocks.

S301: the bird feeder can shoot video information of a bird in a preset area through the camera component.

S302: the bird feeder can transmit the video information to an electronic device to indicate the electronic device to determine a category of the bird and a state of the bird based on the video information.

S303: the bird feeder can receive the category of the bird and the state of the bird from the electronic device.

Specifically, the electronic device may be a single server or a server cluster; the multi-task recognition model is a model pre-trained by the electronic device. Refer to the description of the multi-task recognition model in the foregoing embodiment, which is not repeated here, for more details.

S304: the bird feeder can determine whether bird food needs to be fed and the category of bird food to be fed according to the category of the bird and the state of the bird.

S305: under the circumstance that the bird food needs to be fed, the bird feeder can select a bird food of a corresponding category for feeding according to the category of the bird food to be fed.

From the above analysis, it can be seen that the intelligent bird feeding method provided by the embodiment according to the present disclosure uses the camera component on the bird feeder to shoot the video information of the bird in the preset area. The video information is analyzed to determine the category of the bird and the state of the bird; and then the bird feeder can determine whether to feed bird food and what needs to be fed according to the category of the bird and the state of the bird. Under the circumstance that the bird food needs to be fed, selecting a bird food of a corresponding category for feeding according to the category of the bird food to be fed. Automatic bird feeding without manual assistance can be realized, and thus intelligent bird feeding can be realized.

Figure 4:
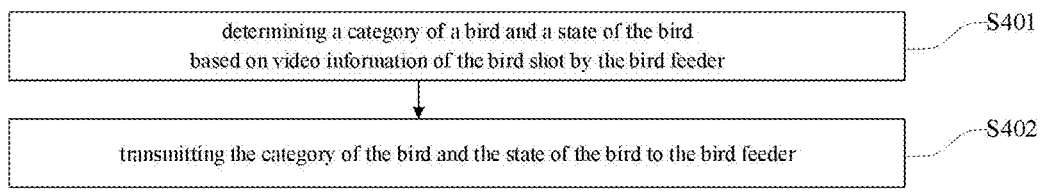
FIG. 4 is a flow diagram of an intelligent bird feeding method according to yet another embodiment of the present disclosure.

FIG. 4 is a flow diagram of an intelligent bird feeding method according to yet another embodiment of the present disclosure. The intelligent bird feeding method provided in the present embodiment can be executed by an electronic device communicatively connected to the bird feeder shown in FIG. 1. Referring to FIG. 4, the intelligent bird feeding method may comprise the following blocks.

S401: the electronic device can determine a category of a bird and a state of the bird based on video information of the bird shot by the bird feeder.

Typically, the electronic device can receive the video information from the bird feeder, and then analyze the video information through a pre-trained multi-task recognition model to obtain the category of the bird and the state of the bird.

Typically, before the analyzing, the electronic device can further obtain the pre-trained multi-task recognition model through a training process and a testing process. Refer to the description of the multi-task recognition model in the foregoing embodiment, which is not repeated here, for more details.

The training process may comprise training a preset multi-task recognition model based on training samples each labeled with a category of a bird contained therein and a state of the bird contained therein to obtain a trained multi-task recognition model. The testing process may comprise input testing samples each containing a first bird to the trained multi-task recognition model for analyzation, and determining a recognition accuracy of the trained multi-task recognition model based on outputs of the trained multi-task recognition model.

Typically, the determining the recognition accuracy of the trained multi-task recognition model based on the outputs of the trained multi-task recognition model comprises: under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples; under the circumstance that the recognition accuracy is smaller than or equal to the preset probability threshold, determining that the test for the recognition accuracy is not passed, and increasing a number of the training samples and repeating the training process and the testing process until the test for the recognition accuracy is passed.

Typically, the pre-trained multi-task recognition model comprises a first output branch and a second output branch, the first output branch is configured to output the category of the bird, and the second output branch is configured to output the state of the bird.

S402: the electronic device can transmit the category of the bird and the state of the bird to the bird feeder.

Figure 5:
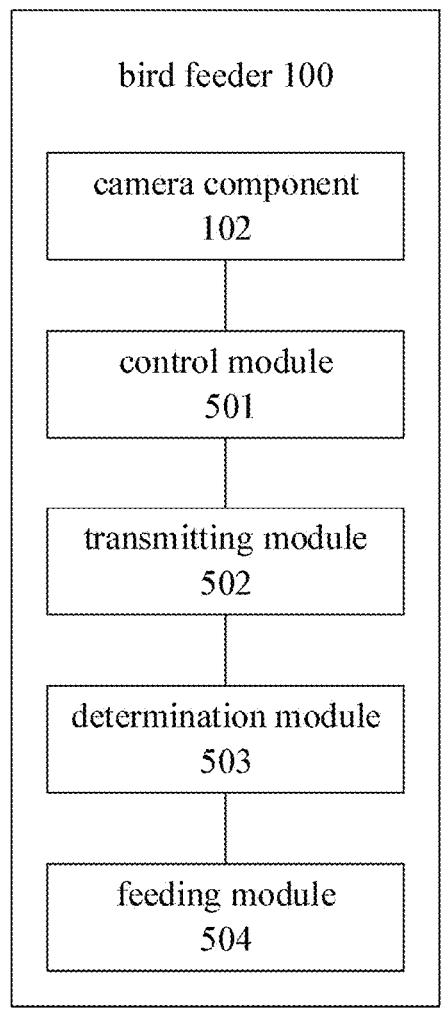
FIG. 5 is a schematic diagram of a bird feeder according to an embodiment of the present disclosure.

The electronic device can transmit the category of the bird and the state of the bird to the bird feeder, so as to indicate the bird feeder to determine whether a bird food needs to be fed and a category of the bird food to be fed based on the category of the bird and the state of the bird, and under the circumstance that the bird food needs to be fed select a bird food of a corresponding category for feeding according to the category of the bird food to be fed FIG. 5 is a schematic diagram of an electronic device according to an embodiment of the present disclosure. In the present embodiment, the bird feeder 100 includes a camera component 102, a control module 501, a transmitting module 502, a determination module 503, and a feeding module 504.

The control module 501 is configured to control the camera component to shoot video information of a bird in a preset area.

The transmitting module 502 is configured to transmit the video information to an electronic device to indicate the electronic device to determine a category of the bird and a state of the bird based on the video information.

The determining module 503 is configured to determine whether a bird food needs to be fed and a category of the bird food to be fed based on the category of the bird and the state of the bird.

The feeding module 504 is configured to, under the circumstance that the bird food needs to be fed, select a bird food of a corresponding category for feeding according to the category of the bird food to be fed.

In an embodiment, the transmitting module 502 is specifically configured to transmit the video information to the electronic device to indicate the electronic device to analyze the video information through a pre-trained multi-task recognition model to obtain the category of the bird and the state of the bird.

In an embodiment, the bird feeder further includes a receiving module, and the receiving module is configured to receive the category of the bird and the state of the bird from the electronic device.

In an embodiment, the pre-trained multi-task recognition model is obtained through a training process and a testing process.

The training process comprises training a preset multi-task recognition model based on training samples each labeled with a category of a bird contained therein and a state of the bird contained therein to obtain a trained multi-task recognition model.

The testing process comprises inputting testing samples each containing a first bird to the trained multi-task recognition model for analyzation, and determining a recognition accuracy of the trained multi-task recognition model based on outputs of the trained multi-task recognition model.

In an embodiment, the determining the recognition accuracy of the multi-task recognition model after the training based on the category of the bird and the state of the bird output by the multi-task recognition model after the training includes:

In an embodiment, the determining the recognition accuracy of the trained multi-task recognition model based on the outputs of the trained multi-task recognition model comprises: under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples; under the circumstance that the recognition accuracy is smaller than or equal to the preset probability threshold, determining that the test for the recognition accuracy is not passed, and increasing a number of the training samples and repeating the training process and the testing process until the test for the recognition accuracy is passed.

In an embodiment, the pre-trained multi-task recognition model comprises a first output branch and a second output branch, the first output branch is configured to output the category of the bird, and the second output branch is configured to output the state of the bird.

In an embodiment, the determining module 503 is specifically configured to determine whether the bird food needs to be fed based on a pre-saved first mapping relationship between bird states and bird food dosages; and determine the category of the bird food to be fed based on a pre-saved second mapping relationship between bird categories and bird food categories.

In an embodiment, the communication module includes a wireless communication module and/or a wired communication module.

Figure 6:
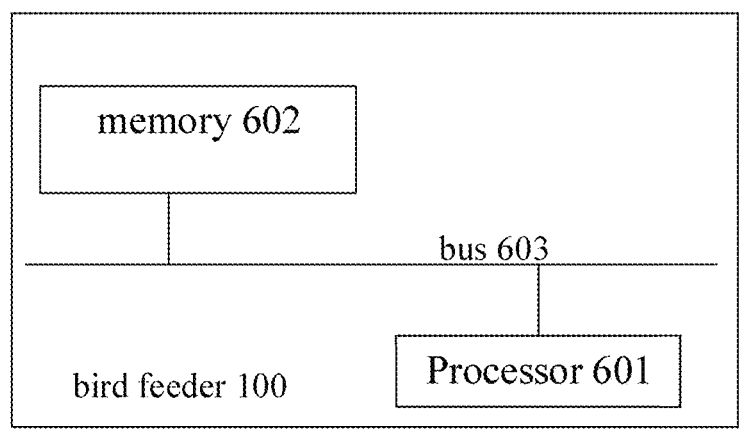
FIG. 6 is a schematic diagram of a framework of a bird feeder according to an embodiment of the present disclosure.

FIG. 6 is a schematic diagram of a framework of a bird feeder according to an embodiment of the present disclosure. Referring to FIG. 6 in conjunction with the foregoing embodiments, the bird feeder 100 may further include a processor 601 and a memory 602 in addition to the components shown in FIG. 1 (the components in FIG. 1 are not shown in FIG. 6).

Specifically, the processor 601 and the memory 602 are connected by a bus 603, for example, the bus 603 is an I2C (Inter-integrated Circuit) bus.

Specifically, the processor 601 may be a micro-controller unit (MCU), a central processing unit (Central Processing Unit, CPU), a digital signal processor (Digital Signal Processor, DSP), etc.

Specifically, the memory 602 may be non-transitory memory, such as a Flash chip, a read-only memory (ROM, Read-Only Memory) disk, an optical disk, a USB flash drive, or a mobile hard disk etc.

Specifically, the processor 601 is configured to run program instructions stored in the memory 602, and implement the steps of the intelligent bird feeding methods described above when the program instructions are executed.

Exemplarily, the processor 601 is configured to run program instructions stored in the memory 602, and implement the method comprising the following blocks when the program instructions are executed: shooting video information of a bird in a preset area through the camera component; transmitting the video information to an electronic device to indicate the electronic device to determine a category of the bird and a state of the bird based on the video information; determining whether a bird food needs to be fed and a category of the bird food to be fed based on the category of the bird and the state of the bird; and under the circumstance that the bird food needs to be fed, selecting a bird food of a corresponding category for feeding according to the category of the bird food to be fed.

In an embodiment, after the transmitting the video information to the electronic device to indicate the electronic device to determine the category of the bird and the state of the bird based on the video information, the method further comprises: receiving the category of the bird and the state of the bird from the electronic device.

In an embodiment, the transmitting the video information to the electronic device to indicate the electronic device to determine the category of the bird and the state of the bird based on the video information comprises transmitting the video information to the electronic device to indicate the electronic device to analyze the video information through a pre-trained multi-task recognition model to obtain the category of the bird and the state of the bird.

In an embodiment, the pre-trained multi-task recognition model is obtained through a training process and a testing process; the training process comprises training a preset multi-task recognition model based on training samples each labeled with a category of a bird contained therein and a state of the bird contained therein to obtain a trained multi-task recognition model; the testing process comprises inputting testing samples each containing a first bird to the trained multi-task recognition model for analyzation, and determining a recognition accuracy of the trained multi-task recognition model based on outputs of the trained multi-task recognition model.

In an embodiment, the determining whether the bird food needs to be fed and the category of the bird food to be fed based on the category of the bird and the state of the bird comprises: determining whether the bird food needs to be fed based on a pre-saved first mapping relationship between bird states and bird food dosages; and determining the category of the bird food to be fed based on a pre-saved second mapping relationship between bird categories and bird food categories.

In an embodiment, the selecting the bird food of the corresponding category for feeding according to the category of the bird food to be fed comprises: determining a first bird food bin storing the bird food of the corresponding category based on a pre-saved third mapping relationship between the bird food categories and bird food bin identifications; and selecting the bird food of the corresponding category from the first bird food bin for feeding.

In an embodiment, the selecting the bird food of the corresponding category from the first bird food bin for feeding comprises: detecting a remaining amount of the bird food of the corresponding category in a feeding area; and under the circumstance that the remaining amount is greater than a preset value, not feeding the bird food of the corresponding category, under the circumstance that the remaining amount is smaller than or equal to the preset value, feeding the bird food of the corresponding category.

In an embodiment, the determining the recognition accuracy of the trained multi-task recognition model based on the outputs of the trained multi-task recognition model comprises: under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples; under the circumstance that the recognition accuracy is smaller than or equal to the preset probability threshold, determining that the test for the recognition accuracy is not passed, and increasing a number of the training samples and repeating the training process and the testing process until the test for the recognition accuracy is passed.

In an embodiment, the pre-trained multi-task recognition model comprises a first output branch and a second output branch, the first output branch is configured to output the category of the bird, and the second output branch is configured to output the state of the bird.

In an embodiment, the communication module includes a wireless communication module and/or a wired communication module.

The specific principles and implementation of the terminal provided in the embodiment according to the present disclosure are similar to the implementation of the intelligent bird feeding method in the foregoing embodiment, and will not be repeated here.

Figure 7:
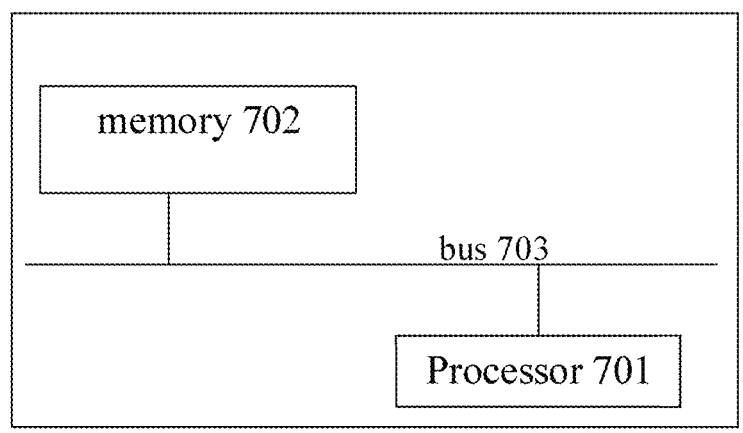
FIG. 7 is a schematic diagram of a framework of an electronic device according to an embodiment of the present disclosure.

FIG. 7 is a schematic diagram of an electronic device according to an embodiment of the present disclosure. Referring to FIG. 7, the electronic device may include a processor 701 and a memory 702.

Specifically, the processor 701 and the memory 702 are connected by a bus 703, for example, the bus 703 is an I2C (Inter-integrated Circuit) bus.

Specifically, the processor 701 may be a micro-controller unit (MCU), a central processing unit (Central Processing Unit, CPU), a digital signal processor (Digital Signal Processor, DSP), etc.

Specifically, the memory 702 may be non-transitory memory, such as a Flash chip, a read-only memory (ROM, Read-Only Memory) disk, an optical disk, a USB flash drive, or a mobile hard disk etc.

Specifically, the processor 701 is configured to run program instructions stored in the memory 702, and implement the steps of the intelligent bird feeding methods described above when the program instructions are executed.

Exemplarily, the processor 701 is configured to run program instructions stored in the memory 702, and implement the method comprising the following blocks when the program instructions are executed: determining a category of a bird and a state of the bird based on video information of the bird shot by the bird feeder; and transmitting the category of the bird and the state of the bird to the bird feeder to indicate the bird feeder to determine whether a bird food needs to be fed and a category of the bird food to be fed based on the category of the bird and the state of the bird and under the circumstance that the bird food needs to be fed select a bird food of a corresponding category for feeding according to the category of the bird food to be fed.

In an embodiment, the determining the category of the bird and the state of the bird based on video information of the bird shot by the bird feeder comprises: analyzing the video information through a pre-trained multi-task recognition model to obtain the category of the bird and the state of the bird.

In an embodiment, before the analyzing the video information through the pre-trained multi-task recognition model to obtain the category of the bird and the state of the bird, the method further comprises obtaining the pre-trained multi-task recognition model through a training process and a testing process, wherein the training process comprises training a preset multi-task recognition model based on training samples each labeled with a category of a bird contained therein and a state of the bird contained therein to obtain a trained multi-task recognition model; and the testing process comprises inputting testing samples each containing a first bird to the trained multi-task recognition model for analyzation, and determining a recognition accuracy of the trained multi-task recognition model based on outputs of the trained multi-task recognition model.

In an embodiment, the determining the recognition accuracy of the trained multi-task recognition model based on the outputs of the trained multi-task recognition model comprises: under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples; under the circumstance that the recognition accuracy is smaller than or equal to the preset probability threshold, determining that the test for the recognition accuracy is not passed, and increasing a number of the training samples and repeating the training process and the testing process until the test for the recognition accuracy is passed.

In an embodiment, the pre-trained multi-task recognition model comprises a first output branch and a second output branch, the first output branch is configured to output the category of the bird, and the second output branch is configured to output the state of the bird.

The specific principles and implementation of the terminal provided in the embodiment according to the present disclosure are similar to the implementation of the intelligent bird feeding method in the foregoing embodiments, and will not be repeated here.

The embodiment according to the present disclosure also provides a non-transitory computer-readable storage medium, the non-transitory computer-readable storage medium may have program instructions stored therein. The program instructions are capable of being executed by a processor to implement the intelligent bird feeding method comprising the following blocks: shooting video information of a bird in a preset area through the camera component; transmitting the video information to an electronic device to indicate the electronic device to determine a category of the bird and a state of the bird based on the video information; determining whether a bird food needs to be fed and a category of the bird food to be fed based on the category of the bird and the state of the bird; and under the circumstance that the bird food needs to be fed, selecting a bird food of a corresponding category for feeding according to the category of the bird food to be fed.

The non-transitory computer-readable storage medium may be an internal storage unit, such as the hard disk or memory of the terminal, of the terminal described in any of the foregoing embodiments. Alternatively, the non-transitory computer-readable storage medium may be an external storage device, such as a plug-in hard disk, Smart Media Card (SMC), Secure Digital (SD) card, Flash Card, etc., of the terminal.

In an embodiment, after the transmitting the video information to the electronic device to indicate the electronic device to determine the category of the bird and the state of the bird based on the video information, the method further comprises: receiving the category of the bird and the state of the bird from the electronic device.

In an embodiment, the transmitting the video information to the electronic device to indicate the electronic device to determine the category of the bird and the state of the bird based on the video information comprises transmitting the video information to the electronic device to indicate the electronic device to analyze the video information through a pre-trained multi-task recognition model to obtain the category of the bird and the state of the bird.

In an embodiment, the pre-trained multi-task recognition model is obtained through a training process and a testing process; the training process comprises training a preset multi-task recognition model based on training samples each labeled with a category of a bird contained therein and a state of the bird contained therein to obtain a trained multi-task recognition model; the testing process comprises inputting testing samples each containing a first bird to the trained multi-task recognition model for analyzation, and determining a recognition accuracy of the trained multi-task recognition model based on outputs of the trained multi-task recognition model.

In an embodiment, the determining whether the bird food needs to be fed and the category of the bird food to be fed based on the category of the bird and the state of the bird comprises: determining whether the bird food needs to be fed based on a pre-saved first mapping relationship between bird states and bird food dosages; and determining the category of the bird food to be fed based on a pre-saved second mapping relationship between bird categories and bird food categories.

In an embodiment, the selecting the bird food of the corresponding category for feeding according to the category of the bird food to be fed comprises: determining a first bird food bin storing the bird food of the corresponding category based on a pre-saved third mapping relationship between the bird food categories and bird food bin identifications; and selecting the bird food of the corresponding category from the first bird food bin for feeding.

In an embodiment, the selecting the bird food of the corresponding category from the first bird food bin for feeding comprises: detecting a remaining amount of the bird food of the corresponding category in a feeding area; and under the circumstance that the remaining amount is greater than a preset value, not feeding the bird food of the corresponding category, under the circumstance that the remaining amount is smaller than or equal to the preset value, feeding the bird food of the corresponding category.

In an embodiment, the determining the recognition accuracy of the trained multi-task recognition model based on the outputs of the trained multi-task recognition model comprises: under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples; under the circumstance that the recognition accuracy is smaller than or equal to the preset probability threshold, determining that the test for the recognition accuracy is not passed, and increasing a number of the training samples and repeating the training process and the testing process until the test for the recognition accuracy is passed.

In an embodiment, the pre-trained multi-task recognition model comprises a first output branch and a second output branch, the first output branch is configured to output the category of the bird, and the second output branch is configured to output the state of the bird.

In an embodiment, the communication module includes a wireless communication module and/or a wired communication module.

The embodiment according to the present disclosure also provides a non-transitory computer-readable storage medium, the non-transitory computer-readable storage medium may have program instructions stored therein. The program instructions are capable of being executed by a processor to implement the intelligent bird feeding method comprising the following blocks: determining a category of a bird and a state of the bird based on video information of the bird shot by the bird feeder; and transmitting the category of the bird and the state of the bird to the bird feeder to indicate the bird feeder to determine whether a bird food needs to be fed and a category of the bird food to be fed based on the category of the bird and the state of the bird and under the circumstance that the bird food needs to be fed select a bird food of a corresponding category for feeding according to the category of the bird food to be fed.

The non-transitory computer-readable storage medium may be an internal storage unit, such as the hard disk or memory of the terminal, of the terminal described in any of the foregoing embodiments. Alternatively, the non-transitory computer-readable storage medium may be an external storage device, such as a plug-in hard disk, Smart Media Card (SMC), Secure Digital (SD) card, Flash Card, etc., of the terminal.

In an embodiment, the determining the category of the bird and the state of the bird based on video information of the bird shot by the bird feeder comprises: analyzing the video information through a pre-trained multi-task recognition model to obtain the category of the bird and the state of the bird.

In an embodiment, before the analyzing the video information through the pre-trained multi-task recognition model to obtain the category of the bird and the state of the bird, the method further comprises obtaining the pre-trained multi-task recognition model through a training process and a testing process, wherein the training process comprises training a preset multi-task recognition model based on training samples each labeled with a category of a bird contained therein and a state of the bird contained therein to obtain a trained multi-task recognition model; and the testing process comprises inputting testing samples each containing a first bird to the trained multi-task recognition model for analyzation, and determining a recognition accuracy of the trained multi-task recognition model based on outputs of the trained multi-task recognition model.

In an embodiment, the determining the recognition accuracy of the trained multi-task recognition model based on the outputs of the trained multi-task recognition model comprises: under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples; under the circumstance that the recognition accuracy is smaller than or equal to the preset probability threshold, determining that the test for the recognition accuracy is not passed, and increasing a number of the training samples and repeating the training process and the testing process until the test for the recognition accuracy is passed.

In an embodiment, the pre-trained multi-task recognition model comprises a first output branch and a second output branch, the first output branch is configured to output the category of the bird, and the second output branch is configured to output the state of the bird.

It is to be understood that the terms used herein in the present disclosure are used solely for the purpose of describing particular embodiments and are not intended to limit the present disclosure.

It should also be understood that the term "and/or" as used in the present disclosure and the appended claims refers to any and all possible combinations of one or more of the items listed in connection therewith, and includes such combinations.

In some embodiments of the present disclosure, understandably, the disclosed methods and devices may be implemented in other ways. For example, the embodiments of the devices described above may merely be schematic, for example, the division of modules or units may serve as a logical functional division only, may be divided in another way when actually implemented, for example, a plurality of units or components may be combined or may be integrated into another system, or some features may be ignored, or not implemented. Moreover, the mutual coupling or direct coupling or communication connections shown or discussed may be indirect coupling or communication connections through some interface or device or unit, may be electrical, mechanical, or other forms.

The units illustrated as individual components may or may not be physically separated, and the components displayed as units may or may not be physical units, i.e., the components may be located in one place, or the components may be distributed to a plurality of network units. Some or all of these units may be selected according to practical needs to achieve the purpose of the embodiments.

Alternatively, each functional unit in the various embodiments according to the present disclosure may be integrated into a single processing unit, or each unit may be physically present separately, or two or more units may be integrated into a single unit. The above integrated units may be implemented either in the form of hardware or in the form of software functional units.

The integrated unit, when implemented as a software functional unit and sold or used as an individual product, may be stored in a non-transitory computer-readable storage medium. Understandably, the technical solution of the present disclosure, all or part of the technical solution that essentially contributes to the prior art, may be embodied in the form of a software product that is stored in a storage medium and includes a number of instructions to allow a computer device (may be a personal computer, server, or network device, etc.) or processor to perform all or some of the operations of the various embodiments of the present disclosure. The aforementioned storage medium includes: USB flash drive, removable hard disk, Read-Only Memory (ROM), Random Access Memory (RAM), disk or CD-ROM, and other media that may store program code.

What is claimed is:

1. An intelligent bird feeding method executable for a bird feeder which comprises a camera component, the intelligent bird feeding method comprising:
    shooting video information of a bird in a preset area through the camera component;
    transmitting the video information to an electronic device to indicate the electronic device to determine a category of the bird and a state of the bird based on the video information;
    determining whether a bird food needs to be fed and a category of the bird food to be fed based on the category of the bird and the state of the bird; and
    under the circumstance that the bird food needs to be fed, selecting a bird food of a corresponding category for feeding according to the category of the bird food to be fed,
    wherein the determining whether the bird food needs to be fed and the category of the bird food to be fed based on the category of the bird and the state of the bird comprises: determining whether the bird food needs to be fed based on a pre-saved first mapping relationship between bird states and bird food dosages; and
    determining the category of the bird food to be fed based on a pre-saved second mapping relationship between bird categories and bird food categories.

2. The intelligent bird feeding method of claim 1, further comprising after the transmitting the video information to the electronic device to indicate the electronic device to determine the category of the bird and the state of the bird based on the video information:
    receiving the category of the bird and the state of the bird from the electronic device.

3. The intelligent bird feeding method of claim 1, wherein the transmitting the video information to the electronic device to indicate the electronic device to determine the category of the bird and the state of the bird based on the video information comprises:
    transmitting the video information to the electronic device to indicate the electronic device to analyze the video information through a pre-trained multi-task recognition model to obtain the category of the bird and the state of the bird.

4. The bird feeder of claim 3, wherein the pre-trained multi-task recognition model is obtained through a training process and a testing process;
    the training process comprises training a preset multi-task recognition model based on training samples each labeled with a category of a bird contained therein and a state of the bird contained therein to obtain a trained multi-task recognition model;
    the testing process comprises inputting testing samples each containing a first bird to the trained multi-task recognition model for analyzation, and determining a recognition accuracy of the trained multi-task recognition model based on outputs of the trained multi-task recognition model.

5. The intelligent bird feeding method of claim 1, wherein the selecting the bird food of the corresponding category for feeding according to the category of the bird food to be fed comprises:
determining a first bird food bin storing the bird food of the corresponding category based on a pre-saved third mapping relationship between the bird food categories and bird food bin identifications; and
selecting the bird food of the corresponding category from the first bird food bin for feeding.

6. The intelligent bird feeding method of claim 5, wherein the selecting the bird food of the corresponding category from the first bird food bin for feeding comprises:
detecting a remaining amount of the bird food of the corresponding category in a feeding area; and
under the circumstance that the remaining amount is greater than a preset value, not feeding the bird food of the corresponding category, under the circumstance that the remaining amount is smaller than or equal to the preset value, feeding the bird food of the corresponding category.

7. An intelligent bird feeding method executable for an electronic device communicatively connected to a bird feeder, the intelligent bird feeding method comprising:
determining a category of a bird and a state of the bird based on video information of the bird shot by the bird feeder; and
transmitting the category of the bird and the state of the bird to the bird feeder to indicate the bird feeder to determine whether a bird food needs to be fed and a category of the bird food to be fed based on the category of the bird and the state of the bird and under the circumstance that the bird food needs to be fed select a bird food of a corresponding category for feeding according to the category of the bird food to be fed,
wherein the determining whether the bird food needs to be fed and the category of the bird food to be fed based on the category of the bird and the state of the bird comprises: determining whether the bird food needs to be fed based on a pre-saved first mapping relationship between bird states and bird food dosages; and
determining the category of the bird food to be fed based on a pre-saved second mapping relationship between bird categories and bird food categories.

8. The intelligent bird feeding method of claim 7, wherein the determining the category of the bird and the state of the bird based on video information of the bird shot by the bird feeder comprises:
analyzing the video information through a pre-trained multi-task recognition model to obtain the category of the bird and the state of the bird.

9. The intelligent bird feeding method of claim 8, further comprising before the analyzing the video information through the pre-trained multi-task recognition model to obtain the category of the bird and the state of the bird:
obtaining the pre-trained multi-task recognition model through a training process and a testing process;
wherein the training process comprises training a preset multi-task recognition model based on training samples each labeled with a category of a bird contained therein and a state of the bird contained therein to obtain a trained multi-task recognition model; and
the testing process comprises inputting testing samples each containing a first bird to the trained multi-task recognition model for analyzation, and determining a recognition accuracy of the trained multi-task recognition model based on outputs of the trained multi-task recognition model.

10. The intelligent bird feeding method of claim 9, wherein the determining the recognition accuracy of the trained multi-task recognition model based on the outputs of the trained multi-task recognition model comprises:
under the circumstance that the recognition accuracy is greater than a preset probability threshold, determining that a test for the recognition accuracy is passed, and saving the trained multi-task recognition model as the pre-trained multi-task recognition model, the recognition accuracy being a probability that a first category of the first bird and a first state of the first bird from a label of each of the testing samples are identical to a second category of the first bird and a second state of the first bird from corresponding one of the outputs for each of the testing samples;
under the circumstance that the recognition accuracy is smaller than or equal to the preset probability threshold, determining that the test for the recognition accuracy is not passed, and increasing a number of the training samples and repeating the training process and the testing until the test for the recognition accuracy is passed.

11. The intelligent bird feeding method of claim 8, wherein the pre-trained multi-task recognition model comprises a first output branch and a second output branch, the first output branch is configured to output the category of the bird, and the second output branch is configured to output the state of the bird.

12. A bird feeder comprising a non-transitory memory and a processor which are coupled with each other, wherein the memory is configured to store program instructions, and the processor is capable of executing the program instructions to implement the intelligent bird feeding method of claim 1.

* * * * *